United States Patent
McClendon

(10) Patent No.: US 10,754,348 B2
(45) Date of Patent: Aug. 25, 2020

(54) ENCODED ROAD STRIPING FOR AUTONOMOUS VEHICLES

(71) Applicant: UATC, LLC, San Francisco, CA (US)

(72) Inventor: Brian McClendon, Portola Valley, CA (US)

(73) Assignee: UATC, LLC, San Francisco, CA (US)

( * ) Notice: Subject to any disclaimer, the term of this patent is extended or adjusted under 35 U.S.C. 154(b) by 390 days.

(21) Appl. No.: 15/472,076

(22) Filed: Mar. 28, 2017

(65) Prior Publication Data
US 2018/0282955 A1 Oct. 4, 2018

(51) Int. Cl.
| | |
|---|---|
| *G05D 1/02* | (2020.01) |
| *G01S 19/48* | (2010.01) |
| *E01C 23/22* | (2006.01) |
| *E01F 9/50* | (2016.01) |
| *G08G 1/0962* | (2006.01) |

(52) U.S. Cl.
CPC ......... *G05D 1/0234* (2013.01); *E01C 23/222* (2013.01); *E01F 9/50* (2016.02); *G01S 19/48* (2013.01); *G05D 1/0246* (2013.01); *G08G 1/09623* (2013.01); *G05D 2201/0212* (2013.01)

(58) Field of Classification Search
CPC .. G05D 1/0088; G05D 1/0231; G05D 1/0234; G05D 1/0236; G05D 1/0244; G05D 1/0246; G05D 1/0248; G05D 1/0278; G05D 2201/0212; G05D 2201/0213; G08G 1/09623; G01S 17/87; G01S 19/10; G01S 19/45; G01S 19/48; G06K 9/00798; E01C 19/004; E01C 23/163; E01F 9/50; E01F 9/576; E01F 9/578
See application file for complete search history.

(56) References Cited

U.S. PATENT DOCUMENTS

| | | | | |
|---|---|---|---|---|
| 6,378,772 B1 * | 4/2002 | Yonemura | ............... | G06K 1/125 235/384 |
| 7,610,146 B2 * | 10/2009 | Breed | .................. | B60N 2/2863 701/514 |
| 7,983,838 B1 * | 7/2011 | Mislan | ...................... | E02B 5/06 701/466 |
| 8,078,349 B1 * | 12/2011 | Prada Gomez | ...... | G05D 1/0061 701/1 |

(Continued)

FOREIGN PATENT DOCUMENTS

| | | | |
|---|---|---|---|
| DE | 3307123 A1 * | 9/1984 | |
| FR | 2837599 A1 * | 9/2003 | ............... G08G 1/04 |

(Continued)

OTHER PUBLICATIONS

Bailey, Donald G., "Super-resolution of bar codes", Journal of Electronic Imaging, Jan. 2001, vol. 10(1), pp. 213-220 (Year: 2001).*

(Continued)

*Primary Examiner* — Faris S Almatrahi
*Assistant Examiner* — David A Testardi
(74) *Attorney, Agent, or Firm* — Dority & Manning, PA

(57) ABSTRACT

An autonomous vehicle (AV) can process a live sensor view to autonomously operate acceleration, braking, and steering systems of the AV along a given route. While traveling along the given route, the AV can identify an encoded road stripe in the live sensor view, and decode the encoded road stripe to determine location data corresponding to the encoded road stripe.

8 Claims, 8 Drawing Sheets

(56) References Cited

U.S. PATENT DOCUMENTS

| | | | | |
|---|---|---|---|---|
| 8,321,067 | B1* | 11/2012 | Prada Gomez | G05D 1/0061 701/2 |
| 9,062,979 | B1* | 6/2015 | Ferguson | G01C 21/30 |
| 9,719,801 | B1* | 8/2017 | Ferguson | G01C 25/00 |
| 2001/0032880 | A1* | 10/2001 | Levine | B60K 31/00 235/384 |
| 2002/0030625 | A1* | 3/2002 | Cavallaro | G01C 21/28 342/357.33 |
| 2007/0242883 | A1* | 10/2007 | Kruppa | G06T 3/4069 382/181 |
| 2009/0228204 | A1* | 9/2009 | Zavoli | G01C 21/30 701/532 |
| 2010/0176987 | A1* | 7/2010 | Hoshizaki | G01S 19/45 342/357.23 |
| 2010/0250133 | A1* | 9/2010 | Buros | G01S 19/48 701/472 |
| 2010/0312471 | A1* | 12/2010 | Cheng | B60W 40/072 701/532 |
| 2010/0328054 | A1* | 12/2010 | Yim | G05D 1/0234 340/425.5 |
| 2012/0197519 | A1* | 8/2012 | Richardson | G01C 21/20 701/408 |
| 2013/0184990 | A1* | 7/2013 | Stahlin | G01C 21/00 701/469 |
| 2013/0257649 | A1* | 10/2013 | Chang | G01S 19/45 342/357.28 |
| 2014/0277897 | A1* | 9/2014 | Saiz | B60W 10/06 701/23 |
| 2015/0073705 | A1* | 3/2015 | Hiwatashi | G01S 19/48 701/468 |
| 2015/0185735 | A1* | 7/2015 | Liang | G05D 1/0234 701/523 |
| 2015/0303581 | A1* | 10/2015 | Bodo | G01S 13/426 342/7 |
| 2016/0178382 | A1* | 6/2016 | Kojo | G05D 1/0272 701/25 |
| 2016/0325753 | A1* | 11/2016 | Stein | B60W 40/06 |
| 2017/0174221 | A1* | 6/2017 | Vaughn | G05D 1/0221 |
| 2018/0087907 | A1* | 3/2018 | DeBitetto | G01S 19/46 |

FOREIGN PATENT DOCUMENTS

| | | | | |
|---|---|---|---|---|
| JP | 10153435 | A | * | 6/1998 |
| JP | 10160485 | A | * | 6/1998 |
| JP | 2009145118 | A | * | 7/2009 | G08G 1/04 |
| JP | 2016090557 | A | * | 5/2016 |

OTHER PUBLICATIONS

JPO machine translation of JP 2009-145118 (original JP document published Jul. 2, 2009) (Year: 2009).*

Kato, Yuji et al., "Low resolution QR-code recognition by applying super-resolution using the property of QR-codes", 2011 International Conference on Document Analysis and Recognition, pp. 992-996 (Year: 2011).*

* cited by examiner

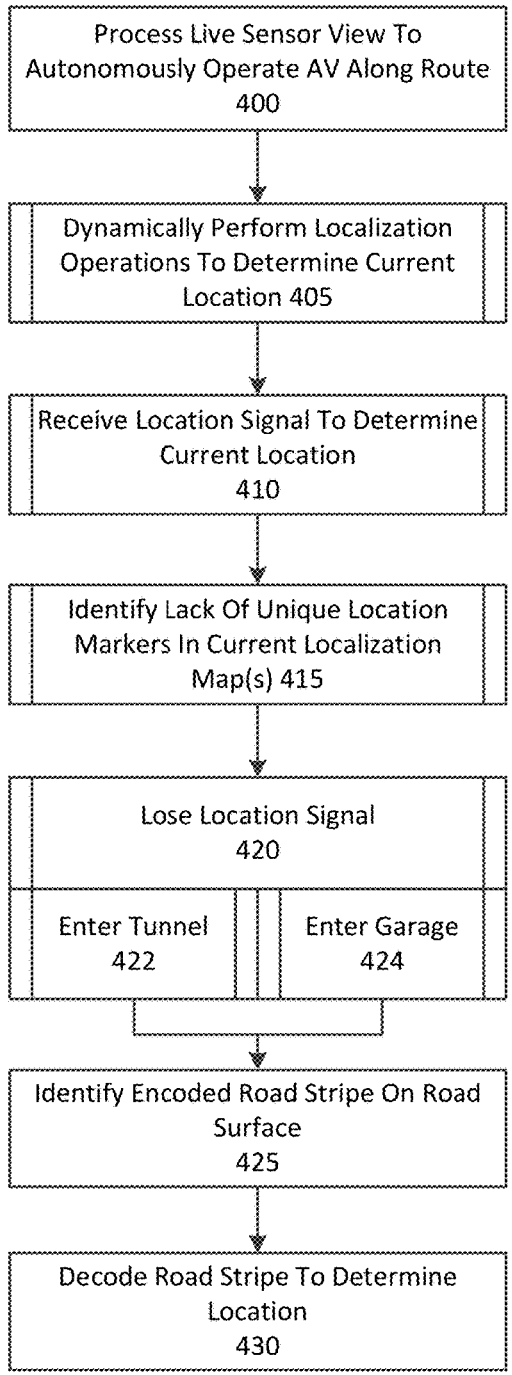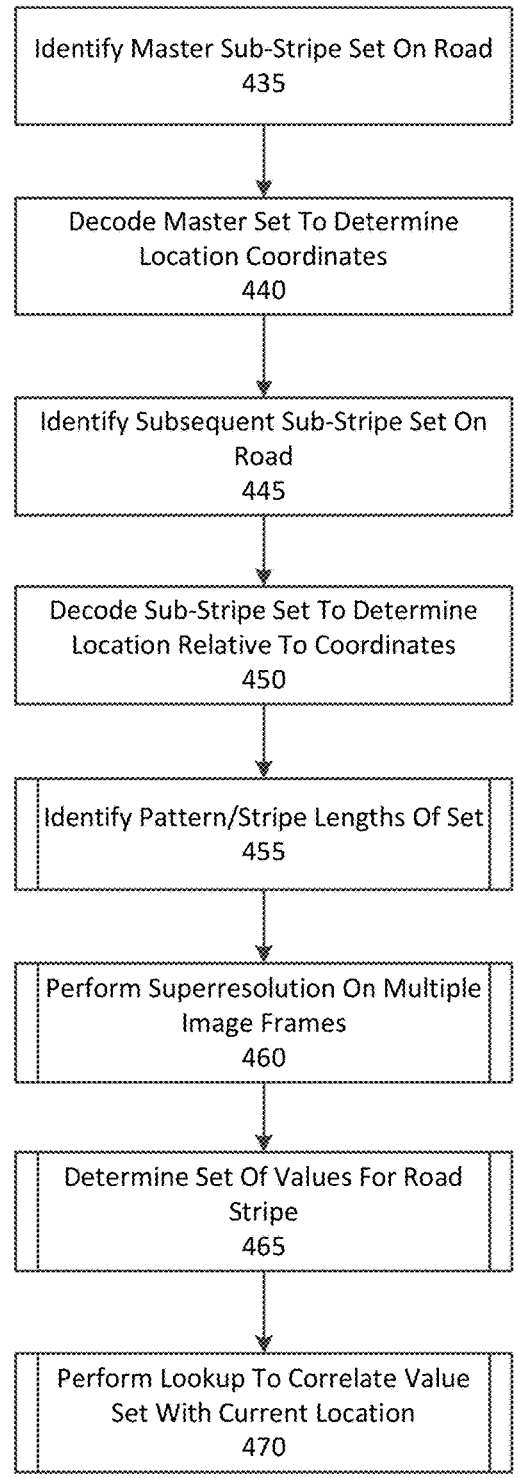
FIG. 4A
FIG. 4B

ENCODED ROAD STRIPING FOR AUTONOMOUS VEHICLES

BACKGROUND

Road surface markings typically provide human drivers with guidance and information to delineate traffic lanes and right of way, and can include various devices (e.g., reflective markers, rumble strips, Botts' dots, etc.) and/or paint. After a new paving, specialized vehicles called "Striper" vehicles can disperse road paint to delineate lanes, and indicate traffic laws, such as double yellow lines to differentiate traffic direction and left-turn prohibition. Such painted road lines and line segments can further indicate lane boundaries, lane change and passing permissions (e.g., broken white and yellow lines), turning permissions (e.g., turn lane markings and combination solid and broken yellow lines), and the like.

BRIEF DESCRIPTION OF THE DRAWINGS

The disclosure herein is illustrated by way of example, and not by way of limitation, in the figures of the accompanying drawings in which like reference numerals refer to similar elements, and in which:

FIGS. 4A and 4B are flow charts describing example methods of processing encoded road stripes, in accordance with example implementations;

DETAILED DESCRIPTION

Figure 1:
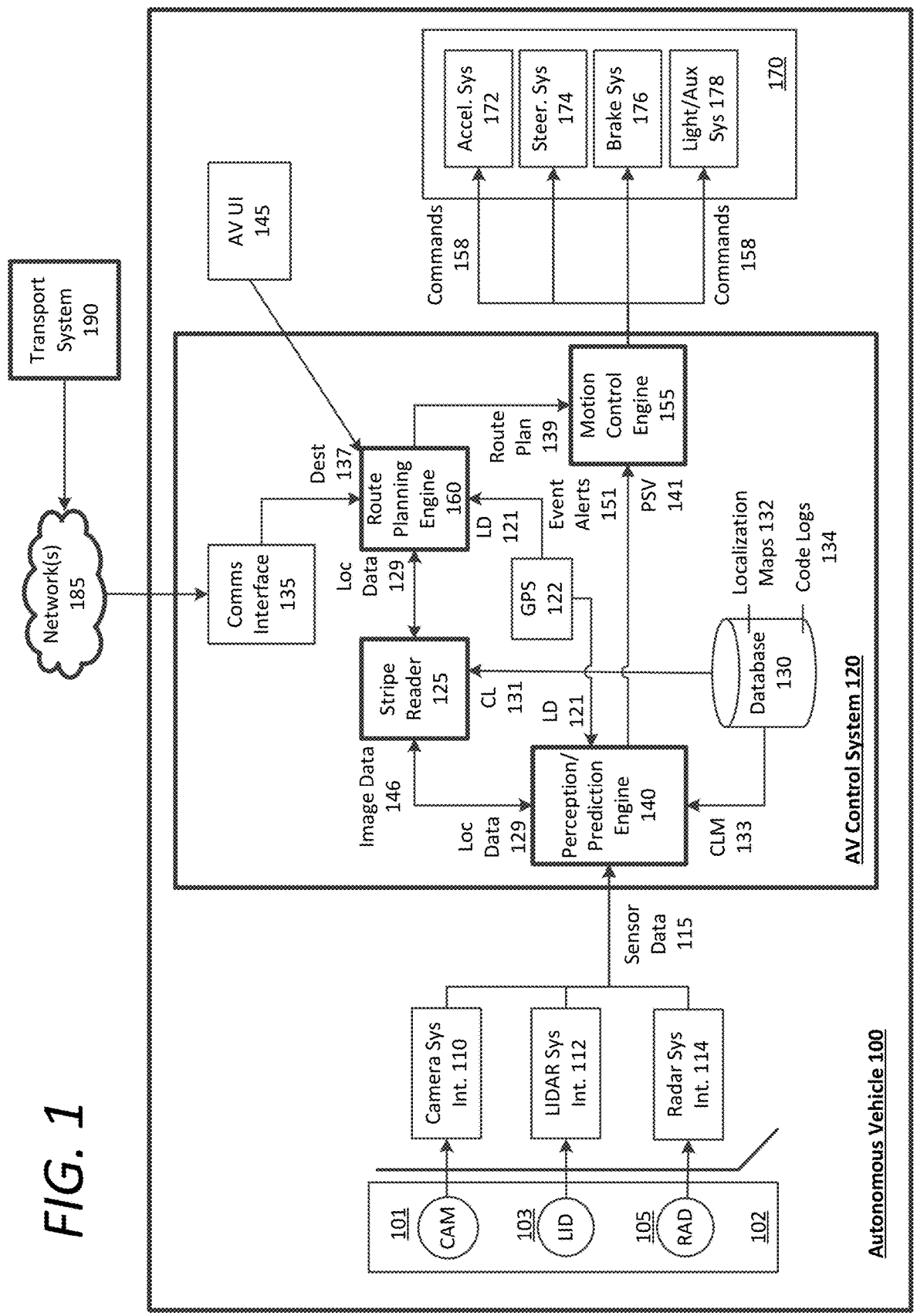
FIG. 1 is a block diagram illustrating an example autonomous vehicle operated by a control system implementing a road stripe reader, as described herein.

An autonomous vehicle (AV) can include a sensor suite to generate a live sensor view of a surrounding area of the AV and acceleration, braking, and steering systems autonomously operated by a control system. In various implementations, the control system can dynamically process and analyze the live sensor view of the surrounding area and a road network map, or highly detailed localization maps, in order to autonomously operate the acceleration, braking, and steering systems along a current route to a destination. The localization maps can comprise previously recorded and labeled LIDAR and/or image data that the control system of the AV can compare with the live sensor view to identify and classify objects of interest (e.g., other vehicles, pedestrians, bicyclists, road signs, traffic signals, etc.). In certain examples, the AV can also perform localization operations using unique location markers in the localization maps to dynamically determine a current location and orientation of the AV. In addition, the AV can include a location-based resource, such as a GPS module, to receive location signals that indicate the current location of the AV with respect to its surrounding environment.

In various examples, the control system of the AV can also determine a current location through the use of encoded road stripes. For example, the use of location-encoded road stripes can be beneficial where GPS signals are typically not received (e.g., within tunnels), or where localization maps do not include adequate location markers (e.g., on rural desert roads or in featureless plains). Described herein is a road marking system that can include one or more paint containers to store road paint, at least one paint gun to output the road paint, and a controller to determine a current location of the road marking system and programmatically apply the road paint to an underlying road surface as a set of sub-stripes to encode the current location into the set of sub-stripes.

In certain implementations, the road marking system can programmatically apply, at a first location, the road paint as a master set of road stripes having location coordinates encoded therein. The master set of encoded road stripes can comprise a location point to which additional encoded road stripes can include relational location data. For example, the master set of encoded road stripes can identify an initial location, and subsequent encoded road stripes can comprise limited data indicating a location relative to the initial location encoded by the master set. Such a configuration can allow for relatively simple striping patterns requiring no more than, for example, ten or twelve bits of encoded information per dependent road stripe. According to examples described herein, the road marking system can be included as a component of a road striper vehicle.

In one aspect, the master set of encoded road stripes can be applied at an entrance to a road tunnel, and each set of dependent encoded stripes can be applied within the tunnel, each indicating a relative location within the tunnel with respect to the tunnel entrance (e.g., a distance and/or vector from the tunnel entrance). The master set of encoded stripes and/or the dependent encoded set of stripes can comprise a single lane divider marking, a side road boundary marker, or a center line on the underlying road surface. In addition to encoding a current location, the road marking system can further encode additional data, such as lane-specific information or a road version indicating when the underlying road surface was paved. In some variations, directional or orientation information may also be encoded in the road stripes. Each encoded road stripe can comprise a set of sub-strips of varying lengths with equal or varying spacing therebetween. Furthermore, by utilizing master-dependency, the encoded road stripes may be quasi-unique, with striping patterns being reusable for differing master-dependent stripe sets (e.g., different tunnels may use the same striping patterns). Still further, the road marking system may integrate the encoded road stripes with traditional road markings to provide for minimal confusion by human drivers. For example, the road marking system can apply normal road markings over the majority of road distance, and incorporate encoded markings sparsely, as described herein An AV is further described throughout the present disclosure that can identify encoded road stripes in its live sensor view and decode the encoded road stripes to determine location data corresponding to each of the encoded road stripes. In some aspects, the AV can store lookup tables to correlate the locations of dependent encoded stripes with a location of an initial master stripe set. As described herein, each encoded road stripe can comprise a set of sub-stripes each having a given length. The location data corresponding to the encoded road stripe can be encoded based on the given length of each of the set of sub-stripes. In variations, the control system of the AV can read the set of sub-stripes from a specified camera of the sensor suite in order to decode the encoded road stripe. In doing so, the control system can perform super-resolution imaging on a set of frames that include the road stripe to read the set of sub-stripes.

As further described herein, the control system can continuously search for encoded road stripes within the live sensor view, or can be triggered to identify encoded road stripes. For example, a backend transport management system can set geo-fences or geo-barriers that, when crossed, can trigger the control system to activate and/or monitor one or more specified cameras for encoded road stripes. Additionally or alternatively, the control system can store a road network map indicating tunnels, highway interchanges, parking garages, and the like. When current route plan indicates a route through such areas, the control system can identify locations at which to begin monitoring for encoded road stripes. In still further variations, the on-board localization maps or sub-maps of road segments can include indicators for the encoded road stripes.

Among other benefits, the examples described herein achieve a technical effect of enabling autonomous vehicles to localize through the use of encoded road striping on paved roads. The benefits of described examples may be most realized where GPS signals cannot be received, and/or relatively featureless road segments lacking unique localization markers.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

As provided herein, the term "autonomous vehicle" (AV) describes vehicles operating in a state of autonomous control with respect to acceleration, steering, braking, auxiliary controls (e.g., lights and directional signaling), and the like. Different levels of autonomy may exist with respect to AVs. For example, some vehicles may enable autonomous control in limited scenarios, such as on highways. More advanced AVs, such as those described herein, can operate in a variety of traffic environments without any human assistance. Accordingly, an "AV control system" can process sensor data from the AV's sensor array, and modulate acceleration, steering, and braking inputs to safely drive the AV along a given route.

System Description

FIG. 1 is a block diagram illustrating an example autonomous vehicle operated by a control system implementing a road stripe reader, as described herein. In an example of FIG. 1, a control system 120 can autonomously operate the AV 100 in a given geographic region for a variety of purposes, including transport services (e.g., transport of humans, delivery services, etc.). In examples described, the AV 100 can operate without human control. For example, the AV 100 can autonomously steer, accelerate, shift, brake, and operate lighting components. Some variations also recognize that the AV 100 can switch between an autonomous mode, in which the AV control system 120 autonomously operates the AV 100, and a manual mode in which a driver takes over manual control of the acceleration system 172, steering system 174, braking system 176, and lighting and auxiliary systems 178 (e.g., directional signals and headlights).

According to some examples, the control system 120 can utilize specific sensor resources in order to autonomously operate the AV 100 in a variety of driving environments and conditions. For example, the control system 120 can operate the AV 100 by autonomously operating the steering, acceleration, and braking systems 172, 174, 176 of the AV 100 to a specified destination 137. The control system 120 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 120 includes computational resources (e.g., processing cores and/or field programmable gate arrays (FPGAs)) which operate to process sensor data 115 received from a sensor system 102 of the AV 100 that provides a sensor view of a road segment upon which the AV 100 operates. The sensor data 115 can be used to determine actions which are to be performed by the AV 100 in order for the AV 100 to continue on a route to the destination 137. In some variations, the control system 120 can include other functionality, such as wireless communication capabilities using a communication interface 135, to send and/or receive wireless communications over one or more networks 185 with one or more remote sources. In controlling the AV 100, the control system 120 can generate commands 158 to control the various control mechanisms 170 of the AV 100, including the vehicle's acceleration system 172, steering system 157, braking system 176, and auxiliary systems 178 (e.g., lights and directional signals).

The AV 100 can be equipped with multiple types of sensors 102 which can combine to provide a computerized perception, or sensor view, of the space and the physical environment surrounding the AV 100. Likewise, the control system 120 can operate within the AV 100 to receive sensor data 115 from the sensor suite 102 and to control the various control mechanisms 170 in order to autonomously operate the AV 100. For example, the control system 120 can analyze the sensor data 115 to generate low level commands 158 executable by the acceleration system 172, steering system 157, and braking system 176 of the AV 100. Execution of the commands 158 by the control mechanisms 170 can result in throttle inputs, braking inputs, and steering inputs that collectively cause the AV 100 to operate along sequential road segments to a particular destination 137.

In more detail, the sensor suite 102 operates to collectively obtain a live sensor view for the AV 100 (e.g., in a forward operational direction, or providing a 360 degree sensor view), and to further obtain situational information proximate to the AV 100, including any potential hazards or obstacles. By way of example, the sensors 102 can include multiple sets of camera systems 101 (video cameras, stereoscopic cameras or depth perception cameras, long range monocular cameras), LIDAR systems 103, one or more radar systems 105, and various other sensor resources such as sonar, proximity sensors, infrared sensors, and the like. According to examples provided herein, the sensors 102 can be arranged or grouped in a sensor system or array (e.g., in a sensor pod mounted to the roof of the AV 100) comprising any number of LIDAR, radar, monocular camera, stereoscopic camera, sonar, infrared, or other active or passive sensor systems.

Each of the sensors 102 can communicate with the control system 120 utilizing a corresponding sensor interface 110, 112, 114. Each of the sensor interfaces 110, 112, 114 can include, for example, hardware and/or other logical components which are coupled or otherwise provided with the respective sensor. For example, the sensors 102 can include a video camera and/or stereoscopic camera system 101 which continually generates image data of the physical environment of the AV 100. The camera system 101 can provide the image data for the control system 120 via a camera system interface 110. Likewise, the LIDAR system 103 can provide LIDAR data to the control system 120 via a LIDAR system interface 112. Furthermore, as provided herein, radar data from the radar system 105 of the AV 100 can be provided to the control system 120 via a radar system interface 114. In some examples, the sensor interfaces 110, 112, 114 can include dedicated processing resources, such as provided with field programmable gate arrays (FPGAs) which can, for example, receive and/or preprocess raw image data from the camera sensor.

In general, the sensor systems 102 collectively provide sensor data 115 to a perception/prediction engine 140 of the control system 120. The perception/prediction engine 140 can access a database 130 comprising stored localization maps 132 of the given region in which the AV 100 operates. The localization maps 132 can comprise highly detailed ground truth data of each road segment of the given region. For example, the localization maps 132 can comprise prerecorded data (e.g., sensor data including image data, LIDAR data, and the like) by specialized mapping vehicles or other AVs with recording sensors and equipment, and can be processed to pinpoint various objects of interest (e.g., traffic signals, road signs, and other static objects). As the AV 100 travels along a given route, the perception/prediction engine 140 can access a current localization map 133 of a current road segment to compare the details of the current localization map 133 with the sensor data 115 in order to detect and classify any objects of interest, such as moving vehicles, pedestrians, bicyclists, and the like.

In various examples, the perception/prediction engine 140 can dynamically compare the live sensor data 115 from the AV's sensor systems 102 to the current localization map 133 as the AV 100 travels through a corresponding road segment. The perception/prediction engine 140 can flag or otherwise identify any objects of interest in the live sensor data 115 that can indicate a potential hazard. In accordance with many examples, the perception/prediction engine 140 can output a processed sensor view 141 indicating such objects of interest to a motion control engine 155 of the AV 100. In further examples, the perception/prediction engine 140 can predict a path of each object of interest and determine whether the AV control system 120 should respond or react accordingly. For example, the perception/prediction engine 140 can dynamically calculate a collision probability for each object of interest, and generate event alerts 151 if the collision probability exceeds a certain threshold. As described herein, such event alerts 151 can be processed by the motion control engine 155 that generates control commands 158 executable by the various control mechanisms 170 of the AV 100, such as the AV's acceleration, steering, and braking systems 172, 174, 176.

On a higher level, the AV control system 120 can include a route planning engine 160 that provides the motion control engine 155 with a route plan 139 to a destination 137. The destination 137 can be inputted by a passenger via an AV user interface 145, or can be received over one or more networks 185 from a backend transportation management system 190 (e.g., that manages and on-demand transportation service). In some aspects, the route planning engine 160 can determine a most optimal route plan 139 based on a current location of the AV 100 and the destination 137.

As provided herein, the motion control engine 155 can directly control the control mechanisms 170 of the AV 100 by analyzing the processed sensor view 141 in light of the route plan 139 and in response to any event alerts 151. Thus, the motion control engine 155 can generate control commands 158 executable by each of the AV's 100 control mechanisms 170 to modulate, for example, acceleration, braking, and steering inputs in order to progress the AV 100 along the current route plan 139.

Examples described herein recognize that interoperability of each of the perception, prediction, and motion control systems of the AV 100 requires localization accuracy that can exceed that available from GPS-based systems. Thus, in addition to a location-based resource (e.g., GPS module 122) that provides location data 121 to the perception/prediction engine 140, the route planning engine 160, and/or other functional modules of the AV control system 120 shown in FIG. 1, the control system 120 can include a stripe reader 125 that can analyze image data 146 from one or more cameras 101 of the sensor suite 102. In analyzing the image data 146 to stripe reader 125 can identify and decode encoded road stripes painted on the underlying road surface on which the AV 100 travels.

As described herein, an encoded road stripe can be painted or otherwise disposed on the road surface as a lane divider line, a portion of a center line, a portion of a lane boundary line, or as a portion of other typical road markings (e.g., lane arrows, painted words, stop lines, crosswalks, etc.). Each encoded road stripe can include a set of sub-stripes of varying lengths, and having equal or variable spacing therebetween. The varied lengths of the sub-stripes and/or spacings between sub-stripes can represent information that the stripe reader 125 can be programmed to decipher, such as location information 129. In certain implementations, the database 130 can include code logs 134 that enable the stripe reader 125 to decode the specialized road stripes. In such implementations, the code logs 134 can match value sets corresponding to encoded road stripes with location data 129 that indicates a precise location of the detected road stripe. For example, upon detecting an encoded road stripe, the stripe reader 125 can analyze the respective lengths of the sub-stripes to determine a value set representing the length of each sub-stripe. The stripe reader 125 may then perform a lookup in code logs 134 to identify a match for the value set, and thus identify the current location of the AV 100.

According to some examples, the code logs 134 can be organized based on defined areas within the given region in which the AV 100 operates (e.g., parsed into square miles of the region, or road segments). For example, a first area can correspond to a first code log in the database 130, and a second area can correspond to a second code log in the database 130. In such examples, the stripe reader 125 can continuously reference a current code log 131 depending on the location of the AV 100 within the given region. Such examples further allow for reuse of striping patterns such that a given encoded road stripe is unique to a specified area or road segment, but not universally unique for the given region.

In variations, the stripe reader 125 can be programmed to decoded road stripes to determine relative locations to defined points represented by master encoded road stripes. For example, a master encoded road stripe can comprise a longer length of encoded road striping (e.g., on a center line lane boundary line), and can include added data indicating the location of the master road stripe. In one example, the master road stripe can encode location coordinates, either locally specific to the given region or universal to the world (e.g., latitude and longitude values). These master encoded road stripes can be placed strategically throughout the given region to provide operating AVs with reference locations for subsequently detected and simpler road stripes. As an example, a master road stripe can be placed before the entrance to a tunnel, and regular encoded road stripes within the tunnel can be encoded with location data 129 relative to the location of the master road stripe. This location data 129 can indicate a distance traveled from the master road stripe, can represent a vector from the master road stripe to the currently detected stripe, or can provide local coordinates relative to the master road stripe. As provided herein, the location data 129 decoded from road stripe by the stripe reader 125 may then be utilized by the control system 120 for localization, perception, and motion planning purposes.

Example stripe readers 125 described herein can further decode information encoded in road stripes, on road signage, or on other encountered surfaces (e.g., tunnel walls, buildings, sounds walls, overpasses, billboards, etc.). Such information can include location data 129 as well as additional information, such as road version information, an indication of a current lane of the AV 100, and/or directional information indicated a direction of travel of the AV 100. In variations, the stripe reader 125 can analyze image data 146 from a single specialized camera of the camera system 101, or multiple cameras, such as forward facing and rearward-facing rooftop cameras of the sensor suite 102. In some examples, the stripe reader 125 can perform super-resolution imaging on the image data 146 in order to more precisely analyze a given encoded road stripe. As such, the stripe reader 125 can combine several different image frames from the image data 146 of a single encoded road stripe in order to precisely measure the lengths of the sub-stripes and/or gaps therebetween.

Road Striper

Figure 2:
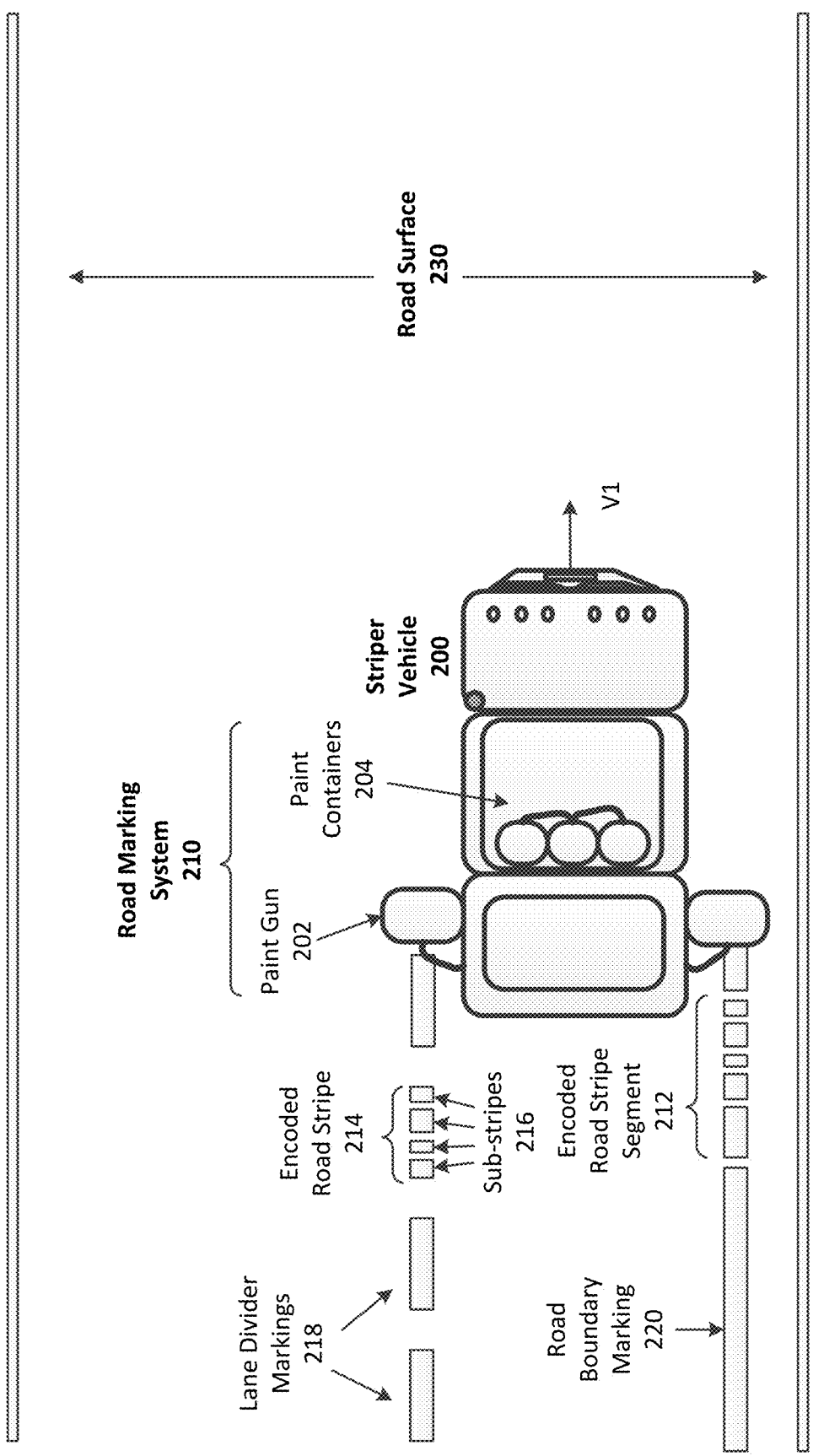
FIG. 2 is a top-down view depicting a road striper vehicle applying encoded road stripes onto a road surface, according to examples described herein.

FIG. 2 is a top down view depicting a road striper vehicle applying encoded road stripes onto a road surface, according to examples described herein. The striper vehicle 200 can comprise a truck or utility vehicle outfitted with road painting equipment that comprises a road marking system 210, such as a set of paint containers 204 and one or more paint guns 202 to disperse the road paint onto a road surface 230. In various examples, the paint guns 202 and/or the striper vehicle 200 can be operated programmatically by computational resources of the road marking system 210 to apply the road paint in a manner that generates encoded road stripe segments 212 and encoded road stripes 214 at specified locations.

In various implementations, the striper vehicle 200 can be driven, either by a human-driver or autonomously, at a steady, low velocity (V1), and programmatic resources of the road marking system 210 can actuate the paint gun(s) 202 to disperse the road paint onto the road surface 230. In doing so, the striper vehicle 100 can apply standard lane divider markings 218, center lines, road boundary markings 220, as well as encoded road stripes 214 and strip segments 212 described herein. In certain examples, the striper vehicle 200 can include location based resources and/or one or more wheel encoders to determine relative distances and/or vector data between respective encoded road stripes 214 or encoded stripe segments 212.

As shown in FIG. 2, each encoded road stripe 214 or encoded stripe segment 212 can comprise a set of sub-stripes 216 of varying lengths that represent the encoded data thereon. As described herein, the encoded data can comprise location data indicating a precise location of the encoded road stripe 214 or encoded road stripe segment 212 respectively. In certain examples, multiple sequential lane divider markings 218 can be encoded with information to increase the amount of information decodable by AVs. Likewise, greater segments of road boundary markings 220 can be encoded to increase the amount of information encoded thereon. In various examples described herein, a lengthy encoded road stripe segment 212 can comprise master location information upon which subsequently detected encoded road stripes 214 can depend. In such examples, the shorter, subsequently detected road stripes 214 can encode a snippet of location information that identifies its relative location to a previously detected master road stripe.

Autonomous Vehicle in Operation

Figure 3A:
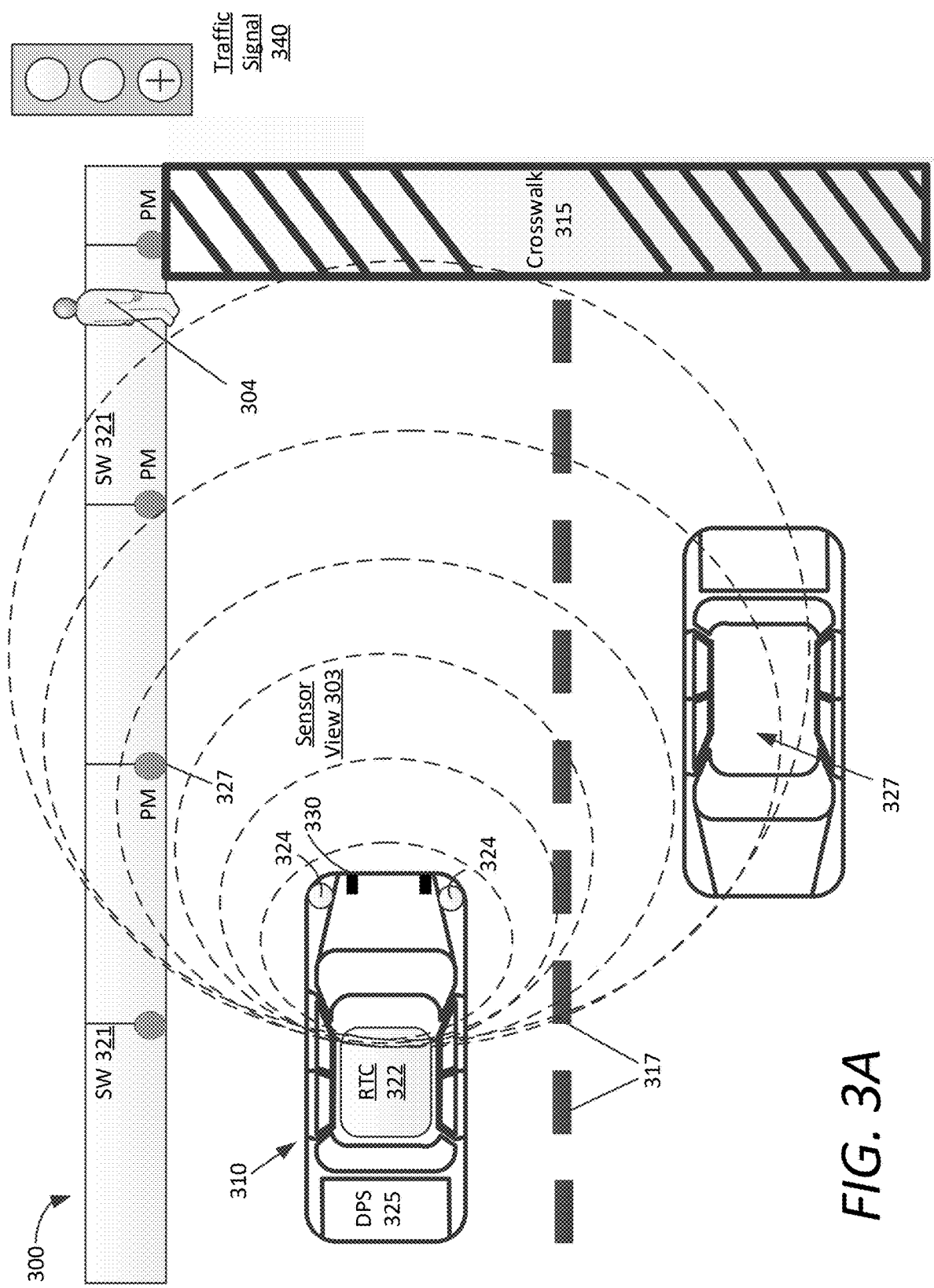
FIG. 3A shows an example autonomous vehicle utilizing sensor data to navigate an environment in accordance with example implementations.

FIG. 3A shows an example autonomous vehicle utilizing sensor data to navigate an environment in accordance with example implementations. In an example of FIG. 3A, the autonomous vehicle 310 may include various sensors, such as a roof-top camera array (RTC) 322, forward-facing cameras 324 and laser rangefinders 330. In some aspects, a data processing system 325, comprising a computer stack that includes a combination of one or more processors, FPGAs, and/or memory units, can be positioned in the cargo space of the vehicle 310.

According to an example, the vehicle 310 uses one or more sensor views 303 (e.g., a stereoscopic or 3D image of the environment 300) to scan a road segment on which the vehicle 310 traverses. The vehicle 310 can process image data or sensor data, corresponding to the sensor views 303 from one or more sensors in order to detect objects that are, or may potentially be, in the path of the vehicle 310. In an example shown, the detected objects include a pedestrian 3047 and another vehicle 327—each of which may potentially cross into a road segment along which the vehicle 310 traverses. The vehicle 310 can use information about the road segment and/or image data from the sensor views 303 to determine that the road segment includes a divider 317 and an opposite lane, as well as a sidewalk (SW) 321, and sidewalk structures such as parking meters (PM) 327.

The vehicle 310 may determine the location, size, and/or distance of objects in the environment 300 based on the sensor view 303. For example, the sensor views 303 may be 3D sensor images that combine sensor data from the roof-top camera array 322, front-facing cameras 324, and/or laser rangefinders 330. Accordingly, the vehicle 310 may accurately detect the presence of objects in the environment 300, allowing the vehicle 310 to safely navigate the route while avoiding collisions with other objects.

According to examples, the vehicle 310 may determine a probability that one or more objects in the environment 300 will interfere or collide with the vehicle 310 along the vehicle's current path or route. In some aspects, the vehicle 310 may selectively perform an avoidance action based on the probability of collision. The avoidance actions may include velocity adjustments, lane aversion, roadway aversion (e.g., change lanes or drive further from the curb), light or horn actions, and other actions. In some aspects, the avoidance action may run counter to certain driving conventions and/or rules (e.g., allowing the vehicle 310 to drive across center line to create space for bicyclist).

The AV 310 can further detect certain road features that can increase the vehicle's alertness, such as a crosswalk 315 and a traffic signal 340. In the example shown in FIG. 3A, the AV 310 can identify certain factors that can cause the vehicle 310 to enter a high alert state, such as the pedestrian 304 being proximate to the crosswalk 315. Furthermore, the AV 310 can identify the signal state of the traffic signal 340 (e.g., green) to determine acceleration and/or braking inputs as the AV 310 approaches the intersection.

Figure 3B:
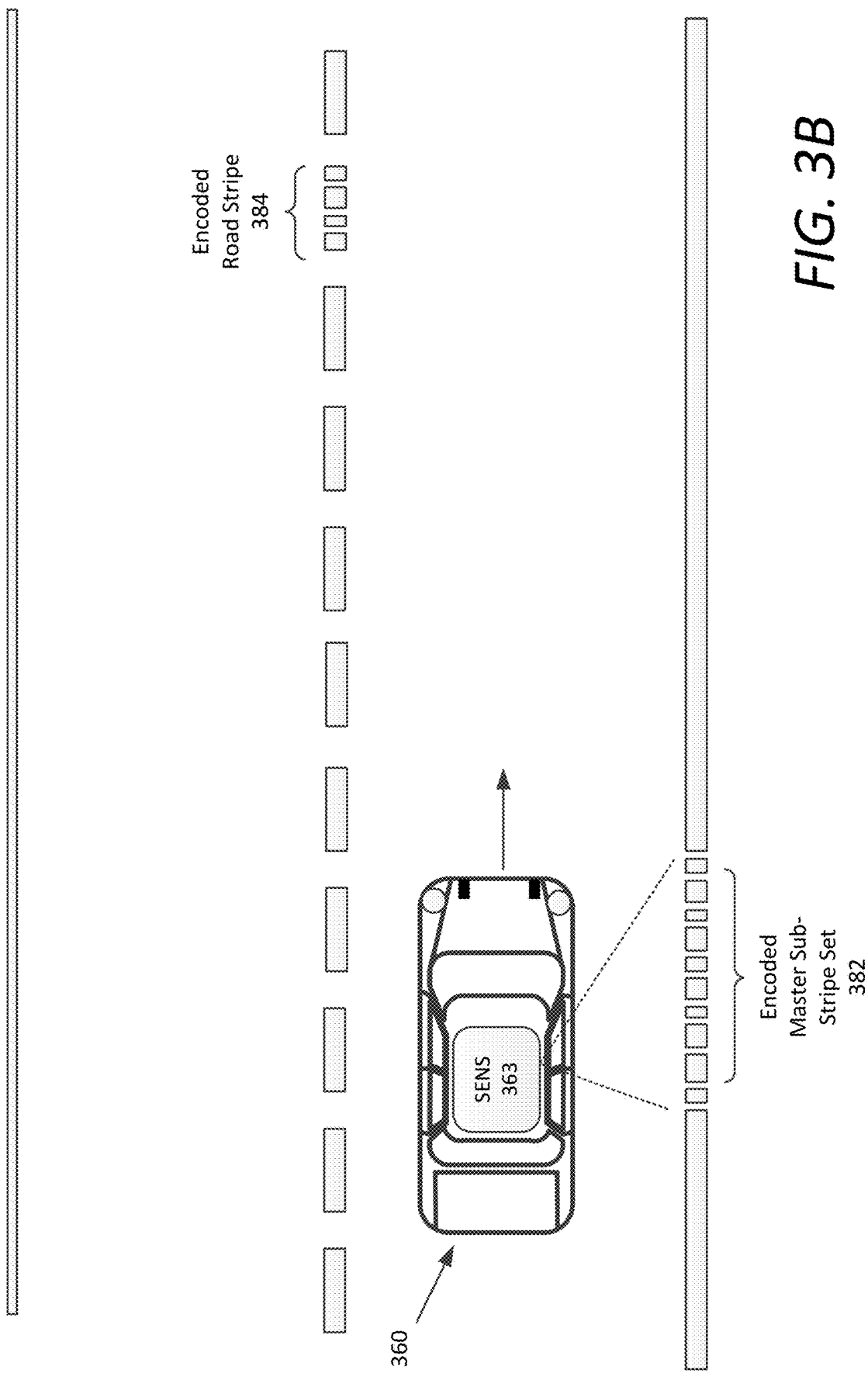
FIG. 3B shows and example autonomous vehicle processing encoded road stripes, as described herein.

FIG. 3B shows and example autonomous vehicle processing encoded road stripes, as described herein. The AV 360 of FIG. 3B can autonomous drive along a current route. As described herein, the sensor suite 363 of the AV 360 can detect an encoded master sub-stripe set 382 representing an initial location upon which subsequent encoded road stripes 384 are dependent. For example, a longer, encoded master sub-stripe set 382 can be detected by the AV 360, and decoded to identify location coordinates indicating the current location of the AV 360. A subsequent encoded road stripe 384 can then be detected and decoded by the AV 360. In decoding the subsequent road stripe 384, the AV 360 can determine a relative location in relation to the master sub-stripe set 382 (e.g., a distance or vector).

Methodology

FIGS. 4A and 4B are flow charts describing example methods of processing encoded road stripes, in accordance with example implementations. In the below descriptions of FIGS. 4A and 4B, reference may be made to reference characters representing like features as shown and described with respect to FIGS. 1, 2, 3A, and 3B. Furthermore the steps and processes described with respect to FIGS. 4A and 4B may be performed by an example AV control system 120 as shown and described with respect to FIG. 1. Referring to FIG. 4, the AV control system 120 can process a live sensor view 303 to autonomously operate the control mechanisms 170 of the AV 100 along a given route (400). In doing so, the AV control system 120 can dynamically perform localization operations to determine a current location and/or orientation of the AV 100 (405). In certain examples, the AV control system 120 can also receive location signals (e.g., GPS signals) to determine the current location of the AV 100 (410).

As described herein, the stripe reader 125 of the AV control system 120 can operate continuously or can be triggered to operate based on one or more conditions. For example, the AV control system 120 can identify a lack of unique location markers in a current localization map 133 or a current sequence of localization maps (415). This scenario can occur when the AV 100 is driving along a rural road with a relatively featureless landscape, or through a long tunnel. As another example, the AV control system 120 can lose the location signal (420), such as when entering a tunnel (422) or a parking garage (424). Each or both of these conditions may trigger the road stripe reading functions of the AV 100. In one aspect, the triggering condition can cause the AV control system 120 to activate a specific camera or multiple cameras specially angled and/or designed to read encoded road stripes. In variations, the control system 120 can monitor and analyze image data 146 from the existing camera system 101 of the AV's sensor suite 102 (e.g., one or more rooftop cameras).

According to examples described herein, the AV control system 120 can identify an encoded road stripe on 384 on the underlying road surface 230 (425). The AV control system 120 may then decode the encoded road stripe 384 to determine the current location of the AV 100 (430).

Referring to FIG. 4B, according to various examples, the AV control system 120 can identify an encoded master sub-stripe set 382 on the road (435). As described herein, the encoded master sub-stripe set 382 can represent an initial location upon which subsequently detected encoded road stripes 384 are dependent. Thus, the AV control system 120 can decode the master set 384 to determine a set of location coordinates (e.g., either local coordinates for the given region or latitude/longitude global coordinates) (440). The AV control system 120 may then identify a subsequent sub-stripe set, corresponding to an encoded road stripe 384, on the road (445). The AV control system 120 can decode the sub-strip set to determine the location of the AV 100 in relation to the initial location represented by the master set 382 (450). Based on the relative location, the AV control system 120 can deduce the current location of the AV 100 with respect to the external world in order to perform localization.

In decoding the master and dependent sub-strip sets 382, 384, the AV control system 120 can identify a pattern or measure the respective lengths of each sub-stripe of the encoded set (455). In making the measurements, the AV control system 120 can perform super-resolution imaging on a set of image frames to ensure an accurate reading of the encoded road stripe (460). In certain examples, the AV control system 120 can decode the road stripes 384 by determine a set of values for the encoded road stripe (465). These set of values can comprise the measured respective lengths of each sub-stripe and/or the gaps therebetween. The set of values can be correlated to location information that identifies the precise location of the detected road stripe. In certain examples, the AV control system 120 can perform a lookup using a code log library 134 that matches sets of values corresponding to road stripes with the location of the road stripe in order to determine the current location of the AV 100 (470). As provided herein, the correlated location can correspond to a relative location with respect an initial location represented by a master stripe, or can comprise a set of location coordinates which the AV control system 120 can utilize to localize.

Figure 5:
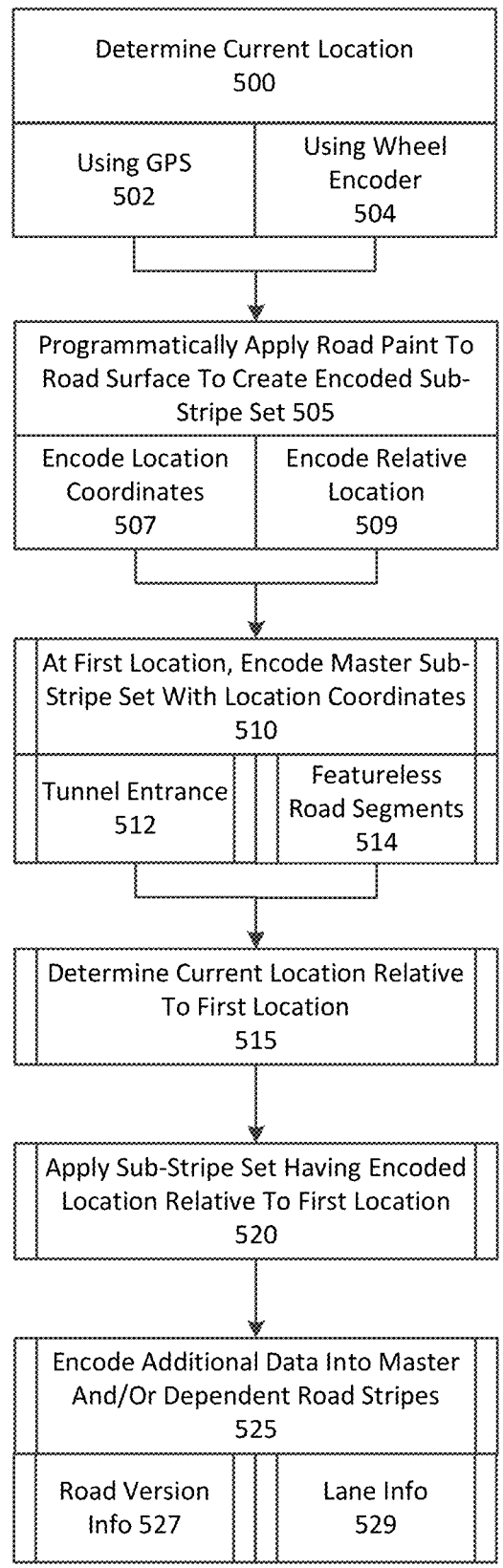
FIG. 5 is a flow chart describing an example method of applying encoded road stripes to a road surface, according to examples described herein.

FIG. 5 is a flow chart describing an example method of applying encoded road stripes to a road surface, according to examples described herein. In the below description of FIG. 5, reference may also be made to reference characters representing like features as shown and described with respect to FIGS. 1, 2, 3A, and 3B. Furthermore the processes described respect to FIG. 5 may be performed by a road marking system 210 implemented on a striper vehicle 200, as shown and described with respect to FIG. 2. Referring to FIG. 5, in certain examples, the road marking system 210 can determine a current location of the striper vehicle 200 (500). In one aspect, the road marking system 210 determines the current location using GPS (502). In variations, the road marking system 210 can determine the current location using a wheel encoder installed on the striper vehicle 200 (504).

The road marking system 210 may then programmatically apply road paint to the road surface 230 to create encoded sub-stripe sets 216 (505). In doing so, the road marking system 210 can encode location coordinates into the road stripe 212 (507) or a relative location into the road stripe 214 in relation to an initial location (e.g., represented by a master encoded road stripe 382) (509). For example, at a first location, the road marking system 210 can encode a master sub-stripe set 382 with location coordinates (510). In various implementations, these master road stripes 382 can be applied by the road marking system 210 in strategic locations throughout the given region, for example, in accordance with a road marking plan that facilitations autonomous vehicle localization. For example, master encoded road stripes 382 may be applied at tunnel entrances (512) or just prior to featureless road segments (514).

According to examples, as the striper vehicle 200 progresses after applying a master road stripe 382, the road marking system 210 can determine a location relative to the first location (515). The road marking system 210 may then apply a sub-stripe set 384 including an encoded location relative to the first location (520). In certain implementations, the road marking system 210 can encode additional information into the master and/or dependent road stripes (525), such as road version information indicating when the road was last paved (527), or lane information specifying the lane in which AVs are traveling when detecting the encoded road stripe (529).

Hardware Diagrams

Figure 6:
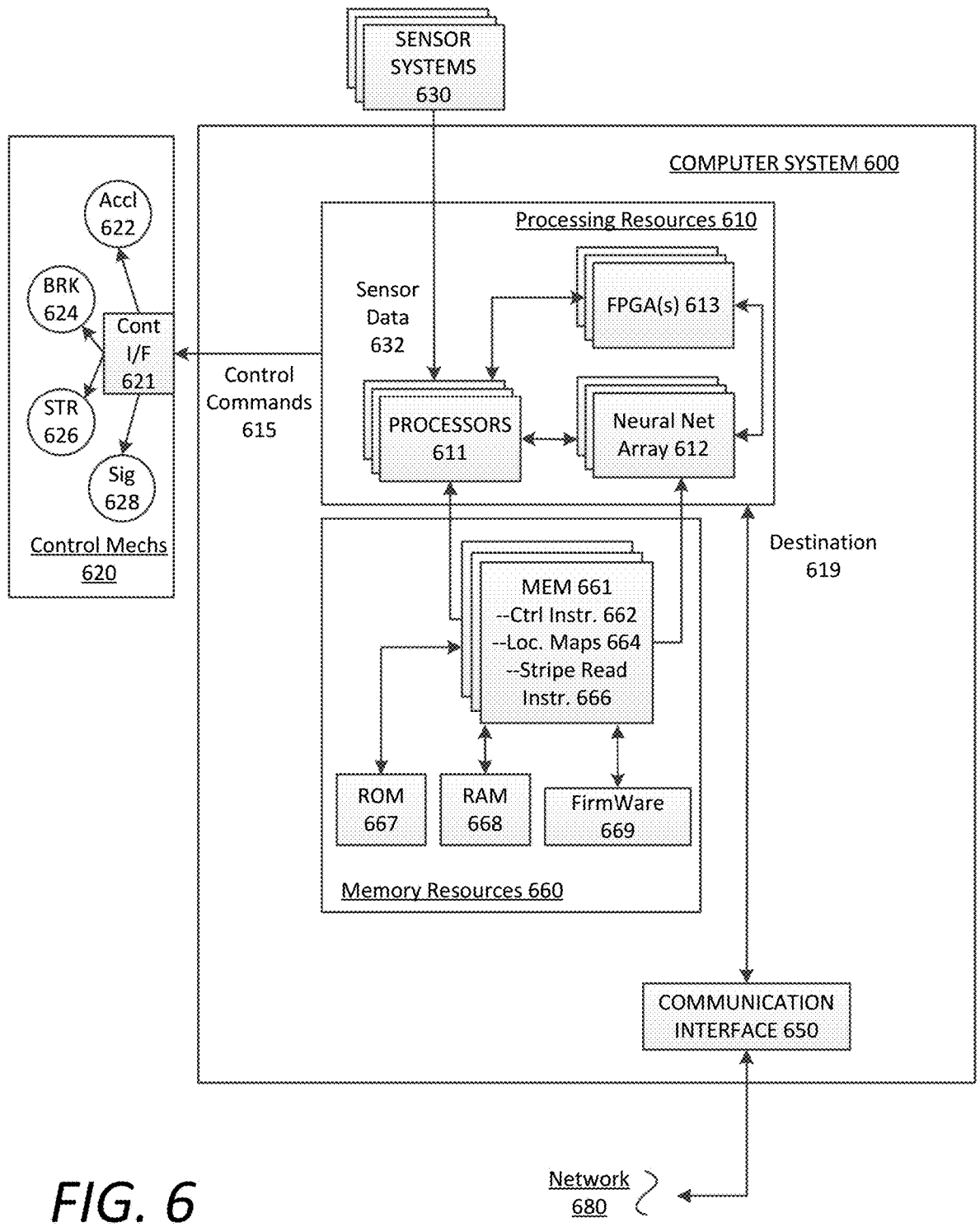
FIG. 6 is a block diagram illustrating a computer system for an autonomous vehicle upon which examples described herein may be implemented.

FIG. 6 is a block diagram illustrating a computer system upon which example AV processing systems described herein may be implemented. The computer system 600 can be implemented using a number of processing resources 610, which can comprise processors 611, field programmable gate arrays (FPGAs) 613. In some aspects, any number of processors 611 and/or FPGAs 613 of the computer system 600 can be utilized as components of a neural network array 612 implementing a machine learning model and utilizing road network maps stored in memory 661 of the computer system 600. In the context of FIGS. 1 and 2, various aspects and components of the AV control system 120, 200, can be implemented using one or more components of the computer system 600 shown in FIG. 6.

According to some examples, the computer system 600 may be implemented within an autonomous vehicle (AV) with software and hardware resources such as described with examples of FIG. 1. In an example shown, the computer system 600 can be distributed spatially into various regions of the AV, with various aspects integrated with other components of the AV itself. For example, the processing resources 610 and/or memory resources 660 can be provided in a cargo space of the AV. The various processing resources 610 of the computer system 600 can also execute control instructions 662 using microprocessors 611, FPGAs 613, a neural network array 612, or any combination of the same.

In an example of FIG. 6, the computer system 600 can include a communication interface 650 that can enable communications over a network 680. In one implementation, the communication interface 650 can also provide a data bus or other local links to electro-mechanical interfaces of the vehicle, such as wireless or wired links to and from control mechanisms 620 (e.g., via a control interface 621), sensor systems 630, and can further provide a network link to a backend transport management system (implemented on one or more datacenters) over one or more networks 680.

The memory resources 660 can include, for example, main memory 661, a read-only memory (ROM) 667, storage device, and cache resources. The main memory 661 of memory resources 660 can include random access memory (RAM) 668 or other dynamic storage device, for storing information and instructions which are executable by the processing resources 610 of the computer system 600. The processing resources 610 can execute instructions for processing information stored with the main memory 661 of the memory resources 660. The main memory 661 can also store temporary variables or other intermediate information which can be used during execution of instructions by the processing resources 610. The memory resources 660 can also include ROM 667 or other static storage device for storing static information and instructions for the processing resources 610. The memory resources 660 can also include other forms of memory devices and components, such as a magnetic disk or optical disk, for purpose of storing information and instructions for use by the processing resources 610. The computer system 600 can further be implemented using any combination of volatile and/or non-volatile memory, such as flash memory, PROM, EPROM, EEPROM (e.g., storing firmware 669), DRAM, cache resources, hard disk drives, and/or solid state drives.

The memory 661 may also store localization maps 664 in which the processing resources 610—executing the control instructions 662—continuously compare to sensor data 632 from the various sensor systems 630 of the AV. Execution of the control instructions 662 can cause the processing resources 610 to generate control commands 615 in order to autonomously operate the AV's acceleration 622, braking 624, steering 626, and signaling systems 628 (collectively, the control mechanisms 620). Thus, in executing the control instructions 662 the processing resources 610 can receive sensor data 632 from the sensor systems 630, dynamically compare the sensor data 632 to a current localization map 664, and generate control commands 615 for operative control over the acceleration, steering, and braking of the AV along a particular motion plan. The processing resources 610 may then transmit the control commands 615 to one or more control interfaces 622 of the control mechanisms 620 to autonomously operate the AV through road traffic on roads and highways, as described throughout the present disclosure.

The memory 661 may also store stripe reading instructions 666 that the processing resources 710 can execute to detect, analyze, and decode encoded road stripes in the sensor data 632 as described throughout the present disclosure. In decoding detected road stripes, the processing resources 610 can determine a current location of the AV when a location-based module (e.g., a GPS module) fails or when unique feature markers in the localization maps 664 are lacking.

Figure 7:
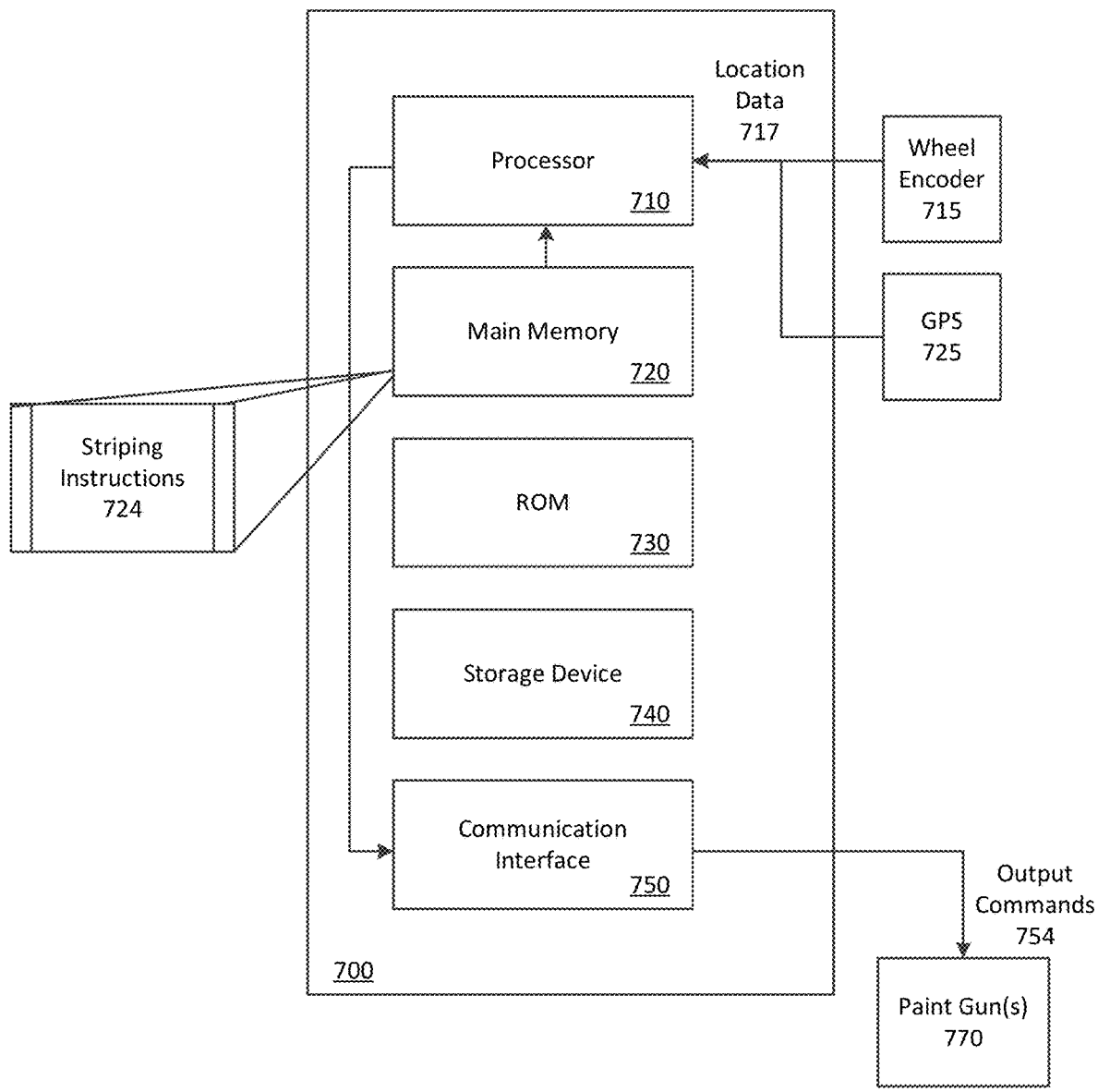
FIG. 7 is a block diagram illustrating a computer system for a road striper vehicle, as described herein.

FIG. 7 is a block diagram that illustrates a computer system upon which examples described herein may be implemented. A computer system 700 can be implemented on, for example, an on-board compute stack of a road striper vehicle. For example, the computer system 700 may be implemented as a road marking system to apply road paint to an underlying road surface programmatically. In the context of FIG. 2, the road marking system 210 may be implemented using a computer system 700 such as described by FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 800 to communicate output commands 754 to one or more paint guns 770 that function to apply road paint to an underlying road surface. The executable instructions stored in the memory 720 can include striping instructions 724, which enables the computer system 700 to generate output commands 754 based on location data 717 as generated by at least one of a wheel encoder 715 or a GPS unit 725 of the striper vehicle. In some aspects, execution of the striping instructions 724 can cause the computer system 700 to automatically determine a specific striping pattern in which to apply a current road line. The striping pattern can encode the location data 717 and can be readable by AVs operating subsequently on the road.

The processor 710 is configured with software and/or other logic to perform one or more processes, steps and other functions described with implementations, such as described with respect to FIGS. 1-5, and elsewhere in the present application. Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. An autonomous vehicle (AV) comprising:
acceleration, braking, and steering systems;
a sensor suite generating live sensor view of a surrounding environment of the AV;
a location-based sensor to dynamically receive a location signal to determine a current location of the AV for the control system;
a database storing a set of localization maps for a given region throughout which the AV operates and a plurality of code logs, wherein each respective code log of the plurality of code logs matches a respective value set corresponding to a respective encoded road stripe to location data indicative of a respective location of the respective encoded road stripe; and
a control system comprising:
one or more processors; and
one or more tangible, non-transitory computer readable media comprising instructions that when executed by the one or more processors cause the control system to perform operations, the operations comprising:
processing the live sensor view to autonomously operate the acceleration, braking, and steering systems of the AV along a given route;
identifying an encoded road stripe in the live sensor view; and
decoding the encoded road stripe to determine a value set corresponding to the encoded road stripe; and determining location data corresponding to the encoded road stripe based on at least one of the plurality of code logs, wherein the control system is triggered to identify the encoded road stripe and decode the encoded road stripe in response to the location-based sensor being unable to receive the location signal to determine the current location of the AV.

2. The AV of claim 1, wherein the location-based sensor being unable to receive the location signal corresponds to the AV entering a tunnel.

3. The AV of claim 2, wherein the location data corresponding to the road stripe identifies a relative location of the AV within the tunnel.

4. The AV of claim 1, wherein the encoded road stripe comprises a set of sub-stripes each having a given length, and wherein the location data corresponding to the encoded road stripe is encoded based on the given length of each of the set of sub-stripes.

5. The AV of claim 4, wherein the control system reads the set of sub-stripes from a specified camera of the sensor suite in order to decode the encoded road stripe.

6. The AV of claim 5, wherein the control system performs super-resolution imaging on a set of frames from the specified camera that include the road stripe to read the set of sub-stripes.

7. The AV of claim 1,
wherein the operations further comprise:
performing localization operations using respective localization maps of the set of localization maps to dynamically determine a current location of the AV.

8. The AV of claim 7, wherein the operations further comprise:
accessing a current localization map of a current road segment;
identifying a lack of unique location markers in the current localization map that otherwise enable the control system to determine the current location of the AV; and
triggering the control system to identify the encoded road stripe and decode the encoded road stripe based on the lack of unique location markers.

* * * * *